Patented Feb. 12, 1935

1,991,085

UNITED STATES PATENT OFFICE 1,991,085

MANUFACTURE OF ALIPHATIC ACID ANHYDRIDES

Henry Dreyfus, London, England

No Drawing. Application August 22, 1932, Serial No. 629,900. In Great Britain September 24, 1931

15 Claims. (Cl. 260—123)

This invention relates to the manufacture of aliphatic anhyrides by the thermal decomposition of aliphatic acids, and especially to the manufacture of acetic anhyride by the thermal decomposition of acetic acid.

I have found that difficultly decomposable sulphates of metals at least as electronegative as aluminium are highly useful catalysts for the thermal decomposition of aliphatic acids into their anhydrides. By the term difficultly decomposable sulphates I mean sulphates that do not undergo substantial decomposition at the temperature employed for the decomposition of the aliphatic acid. Those sulphates which are not decomposed at temperatures of about 700° C. are especially suitable for the purposes of the invention, for example sulphates of chromium, manganese or aluminium. It is very surprising that these sulphates are good catalysts as the metals themselves (and a number of their other compounds, particularly the oxides and carbonates) in many cases entirely fail to produce anhydrides and cause the production of ketones. For instance, manganese oxide, alumina, manganese carbonates, ceria, to name a few of such metals or compounds, result in substantially complete conversion of acetic acid into acetone.

The thermal decomposition may be performed in the presence of the catalysts of the invention in any convenient way, as for instance by passing the aliphatic acid vapour in a stream through tubular or other apparatus containing the catalysts heated to the desired temperature. The vapours may be preheated prior to introducing them into the reaction zone. The decomposition may be effected, for instance, at temperatures of about 400° to 800° C. or more, and especially from about 550° to 650° C. The temperature to be employed with any particular sulphate or sulphates should be insufficiently high to effect any substantial decomposition of the sulphate or sulphates.

Advantageously the sulphates of the invention may be employed precipitated or otherwise coated upon or impregnated in carriers, such for instance as pumice, kieselguhr, carborundum, asbestos or the like.

The thermal decomposition may, if desired, be effected in presence of both the sulphates of the invention and other catalysts capable of promoting the scission of aliphatic acids, whether such other catalysts are solid, liquid, or in vapour form. Where such other catalysts are solids they may, for instance, be impregnated or coated in or upon carriers, together with the sulphates of the invention; for instance sulphates of alkali or earth alakli metals may be so employed in conjunction with the sulphates of the invention.

The anhydride may be recovered from the reaction vapours in any convenient way. Preferably the anhydride is condensed from the vapours while the water is maintained in vapour form, for instance by processes such as described in previous U. S. Patents Nos. 1,735,957 and 1,735,959, or processes involving the removal of water vapours from the vapours or separation of water simultaneously with the condensation, such for instance as the processes described in U. S. Patents Nos. 1,817,614, 1,915,573 and 1,931,687.

The following example illustrates the invention, but it is understood that the invention is in no way limited thereto.

Example

Acetic acid vapour is passed rapidly through a fireclay or copper tube containing pumice impregnated with a mixture of manganous and chromic sulphates, and heated to a temperature between 550° and 650° C. The reaction vapours are fractionally condensed, or subjected to any other treatment to separate the acetic anhydride from water vapour and any unchanged acetic acid vapour.

What I claim and desire to secure by Letters Patent is:—

1. Process of producing anhydrides of lower aliphatic carboxylic acids which comprises thermally decomposing the corresponding acids in the presence of a difficultly decomposable sulphate of a metal at least as electronegative as aluminum.

2. Process of producing acetic anhydride which comprises thermally decomposing acetic acid in presence of a difficultly decomposable sulphate of a metal at least as electronegative as aluminum.

3. Process of producing acetic anhydride which comprises thermally decomposing acetic acid in presence of aluminum sulphate.

4. Process of producing acetic anhydride which comprises thermally decomposing acetic acid in presence of chromic sulphate.

5. Process of producing acetic anhydride which comprises thermally decomposing acetic acid in presence of manganous sulphate.

6. Process of producing acetic anhydride which comprises subjecting acetic acid to a temperature between 400° and 800° C. in the presence of a difficultly decomposable sulphate of a metal at least as electronegative as aluminum.

7. Process of producing acetic anhydride which comprises subjecting acetic acid to a temperature between 550° and 650° C. in the presence of a difficultly decomposable sulphate of a metal at least as electronegative as aluminum.

8. Process of producing acetic anhydride which comprises thermally decomposing acetic acid in the presence of a difficultly decomposable sulphate of a metal at least as electronegative as aluminum in association with an inert carrier.

9. Process of producing acetic anhydride which comprises thermally decomposing acetic acid in presence of a difficultly decomposable sulphate of a metal at least as electronegative as aluminum and a metal sulphate selected from the group which consists of sulphates of the alkali and alkali earth metals.

10. Process of producing acetic anhydride which comprises subjecting acetic acid to a temperature between 550° and 650° C. in the presence of aluminum sulphate.

11. Process of producing acetic anhydride which comprises subjecting acetic acid to a temperature between 550° and 650° C. in the presence of chromic sulphate.

12. Process of producing acetic anhydride which comprises subjecting acetic acid to a temperature between 550° and 650° C. in the presence of manganous sulphate.

13. Process of producing acetic anhydride which comprises subjecting acetic acid to a temperature between 550° and 650° C. in the presence of aluminum sulphate and a sulphate selected from the group which consists of sulphates of the alkali and alkali earth metals.

14. Process of producing acetic anhydride which comprises subjecting acetic acid to a temperature between 550° and 650° C. in the presence of chromic sulphate and a sulphate selected from the group which consists of sulphates of the alkali and alkali earth metals.

15. Process of producing acetic anhydride which comprises subjecting acetic acid to a temperature between 550° and 650° C. in the presence of manganous sulphate and a sulphate selected from the group which consists of sulphates of the alkali and alkali earth metals.

HENRY DREYFUS.